Feb. 11, 1969     M. H. SCHROEDER     3,426,906
SAND FILTER
Filed Dec. 3, 1965
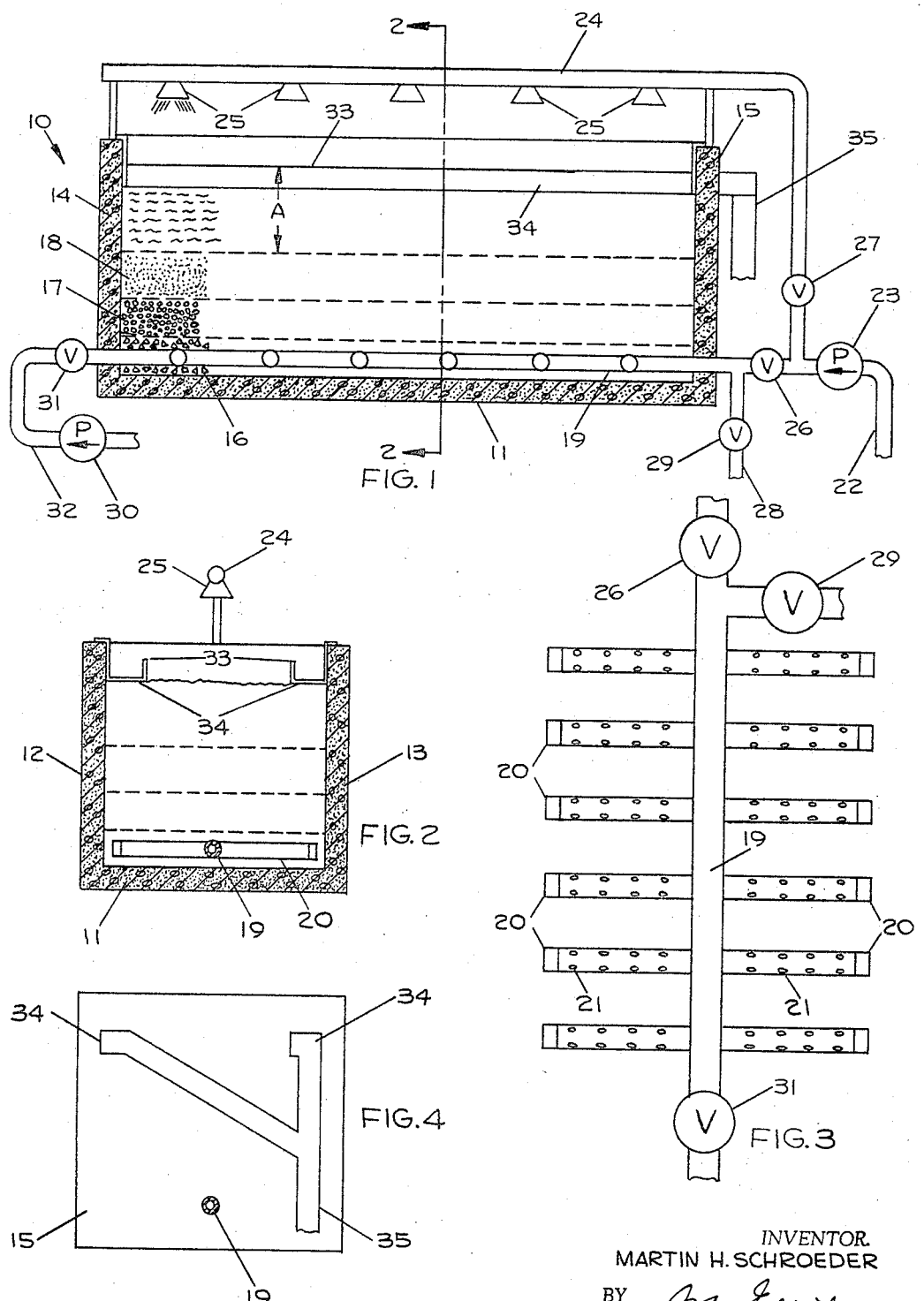
INVENTOR.
MARTIN H. SCHROEDER
BY

United States Patent Office 3,426,906
Patented Feb. 11, 1969

3,426,906
SAND FILTER
Martin H. Schroeder, 904 N. Lyndale,
Faribault, Minn. 55021
Filed Dec. 3, 1965, Ser. No. 511,375
U.S. Cl. 210—279                2 Claims
Int. Cl. B01d 41/02

ABSTRACT OF THE DISCLOSURE

A backwash arrangement for a filter bed comprising a feed pipe extending longitudinally at the bottom of the bed and perforated lateral extensions on said pipe. A pump is connected to each end of the pipe so that backwash water is forced into both ends of the pipe.

---

This invention relates to filters and more particularly it has reference to filters which embody filter beds of sand and are adapted for use in connection with swimming pools or the like.

Filters of the type described must be subjected frequently to a cleansing operation to remove sludge and other impurities which have been deposited from the water which passes through the filter. Such an operation, which is known as backwashing, is usually accomplished by forcing water up through the filter bed under sufficient pressure to produce violent agitation of the sand so as to free the impurities which are carried away with the wash water by means of backwash troughs located above the normal water level of the filter. If any substantial amount of impurities, in the form of coagulated material, remains on top of the filter bed, there is a tendency for such matter to form large agglomerate masses (known as "mud balls") which cannot be carried away in the backwash water. For the proper and efficient functioning of the filter after the backwashing operation, it is essential that the sand in the filter bed return to its former substantially uniform thickness. This will be facilitated by forcing the backwash water up through the filter bed in a manner which is substantially uniform throughout the area of the filter bed. Prior art filters of the type described do not provide for such a uniform action of the backwash water.

One of the objects of my invention is to provide an improved filter of the type described which will be relatively simple in structure yet efficient in operation.

Another object is to provide a filter of the type described in which the filter bed can be cleansed from impurities by a backwashing operation without the formation of agglomerate masses of impurities.

A further object is to provide a filter of the type described in which the backwash water is forced up through the filter bed in a manner which is substantially uniform throughout its area.

These and other objects and advantages reside in certain novel features of construction, arrangement and combination of parts as will hereinafter be more fully described and pointed out in the appended claims.

Referring to the drawings:

FIG. 1 is a longitudinal sectional view of a filter embodying the invention.

FIG. 2 is a vertical sectional view taken on 2—2 of FIG. 1.

FIG. 3 is a plan view of the bottom of the piping system which is located at the lower part of the filter bed.

FIG. 4 is an elevational view of the right hand end of the tank as viewed in FIG. 1.

A preferred embodiment of the invention is disclosed in the drawings wherein 10 indicates, generally, a tank having the bottom 11, side walls 12, 13 and end walls 14, 15. Although the drawing indicates the tank 10 as made of concrete, any other suitable material such as steel, may be used. Within the tank 10 and resting on the bottom 11 is the filter bed which comprises a bottom layer 16 of coarse gravel, an intermediate layer 17 of pea rock and a top layer 18 of sand.

Means for conducting water into and out from the filter and for backwashing the filter bed are provided by a piping system which includes the feed pipe 19 which extends longitudinally and centrally of the tank under the filter bed and out through both end walls 14 and 15. Projecting laterally from both sides of feed pipe 19 are the pipes 20 which are perforated on their under sides as shown at 21. Water which is to be filtered, as from a swimming pool for example, is pumped into the inlet pipe 22 by pump 23 and upwardly into the pipe 24 which extends longitudinally of and above the tank 10. The under side of pipe 24 is provided with several spaced sprayheads 25 through which the water is sprayed into the tank 10. The feed pipe 19 is also connected to pump 23 through valve 26 and while water is being pumped up into pipe 24 the valve 26 is closed and valve 27 is opened. The water from the spray-heads 25 flows down through the successive layers of the filter bed, into the apertures 21 of the lateral pipes 20, out through the outlet pipe 28 and back to the swimming pool or other facility. The outlet pipe 28 includes the valve 29 which is in open position during the filtering operation. The other end of feed pipe 19 is connected to the pump 30 through the valve 31 and the pipe 32. The valve 31 is also in closed position while the filtering operation is in progress.

When it is desired to cleanse the filter bed by a backwashing operation, the valves 27 and 29 are closed and the valves 26 and 31 are opened. The two pumps 23 and 30 are then activated to draw in water from a suitable source and pump it simultaneously into both ends of feed pipe 19. The water, which is under pressure, is thereby directed through the apertures 21 in the lateral pipes 20 and upwardly through the filter bed. This upward rush of the wash water thoroughly churns up the sand so that any agglomerated impurities are disintegrated into small particles so that they are carried away in the wash water which boils up and over the edges 33 of the backwash troughs 34 which extend along the upper portions of both side walls 12 and 13. The backwash troughs 34 extend outwardly through openings in end wall 15 and connect with a pipe 35 which carries away the wash water and its suspended impurities.

Substantially all of the finely divided impurities or coagulated matter should be carried away in the wash water. Otherwise, there is a tendency for it to form agglomerate masses, known as "mud balls," which cannot be removed from the filter bed by the wash water. If the backwash water is not forced up through substantially the entire area of the filter bed at a pressure sufficient to carry away substantially all of the finely divided impurities, those remaining will form agglomerate masses by the process of accretion. By pumping water into both ends of feed pipe 19 at subsantially the same pressure, the backwash water is applied in a manner which is substantially uniform throughout the entire area of the filter bed.

The backwash water is forced up through the filter bed at a rate of 12–16 gallons per minute per square foot of area of the filter bed. The distance from the top of the filter bed to the overflow edge 33 of the backwash trough 34 is known as the "freeboard" distance and is indicated at A in FIG. 1. With the backwash rate of 12–16 gallons per minute per square foot of filter bed and a freeboard distance of 3–4 feet no mud balls are formed and no coagulants are required.

In one successful embodiment of the invention, the tank 10 is rectangular in shape with dimensions of 8 x 16 feet and a depth of 8 feet. The filter bed consists of a bottom layer of uncrushed gravel of about 1½–½ inch, an intermediate layer of finer uncrushed gravel about ½–⅛ inch and a top layer of sand consisting of a bottom stratum with .80–1.20 mm. and a top stratum of .55–.60 mm. while various depths of gravel and sand layers may be used, a total gravel depth of about 2 feet and a sand depth of about 2–3 feet has produced good results. The feed pipe 19 has an inside diameter of 6 inches and each of the lateral pipes 20 is 3 feet long (has an inside diameter of 2½ inches and is perforated with ⅝ inch openings 21. With a freeboard distance of 3 feet 8 inches and the backwash water applied at the rate of 12–16 gallons per minute per square foot of filter bed area, no mud balls are formed.

For proper and efficient operation of the filter bed, it is necessary that it be of substantially uniform thickness, Although the backwash operation produces a violent churning of the sand, the filter layers return substantially to a uniform thickness after the backwash operation because the backwash water is forced up through the filter bed in a manner which is substantially uniform throughout the area of the filter bed.

From the foregoing, it will be apparent that I have provided a filter of the type described which is simple in structure yet efficient in operation. The invention has been used successfully for filtering the water in a very large outdoor swimming pool. The problem of mud ball formation has been eliminated and no coagulants have been required in operating the filter of the invention. The initial cost of installation and the cost of operation of a filter have been reduced to a minimum by use of the filter described herein.

Various modifications may obviously be made without departing from the spirit of the invention as pointed out in the appended calims.

I claim:
1. A filter comprising a tank, a filter bed positioned in the lower portion of the tank, said filter bed having a top layer of sand, means for backwashing the filter bed comprising a feed pipe extending longitudinally along the central portion of the tank and positioned in a lower part of the filter bed, a plurality of perforated pipes extending laterally from opposite sides of the feed pipe, pump means at each end of said feed pipe for forcing water under pressure through said perforated pipes whereby the filter bed is subjected to backwash water in a manner which is substantially uniform throughout the entire area of the filter bed, and troughs mounted at the inner upper edge of the tank for removing the backwash water.

2. The filter described in claim 1 in which the pump means includes a first pump and a second pump, a pipe supplied with sprayhead openings extending over the tank and connected to the first pump through a first valve, said first pump also being connected to one end of said feed pipe through a second valve, said end of the feed pipe being connected to an outlet pipe by a third valve, and the other end of the feed pipe being connected to the second pump through a fourth valve.

References Cited

UNITED STATES PATENTS

| | | | |
|---|---|---|---|
| 1,138,634 | 5/1915 | Davidson | 210—279 X |
| 2,194,071 | 3/1940 | Hine | 210—273 X |
| 2,769,547 | 11/1956 | Hirsch | 210—273 |
| 2,956,682 | 10/1960 | Stephan | 210—279 X |
| 3,286,842 | 11/1966 | De Jong | 210—275 |

SAMIH N. ZAHARNA, *Primary Examiner.*